Patented Dec. 23, 1952

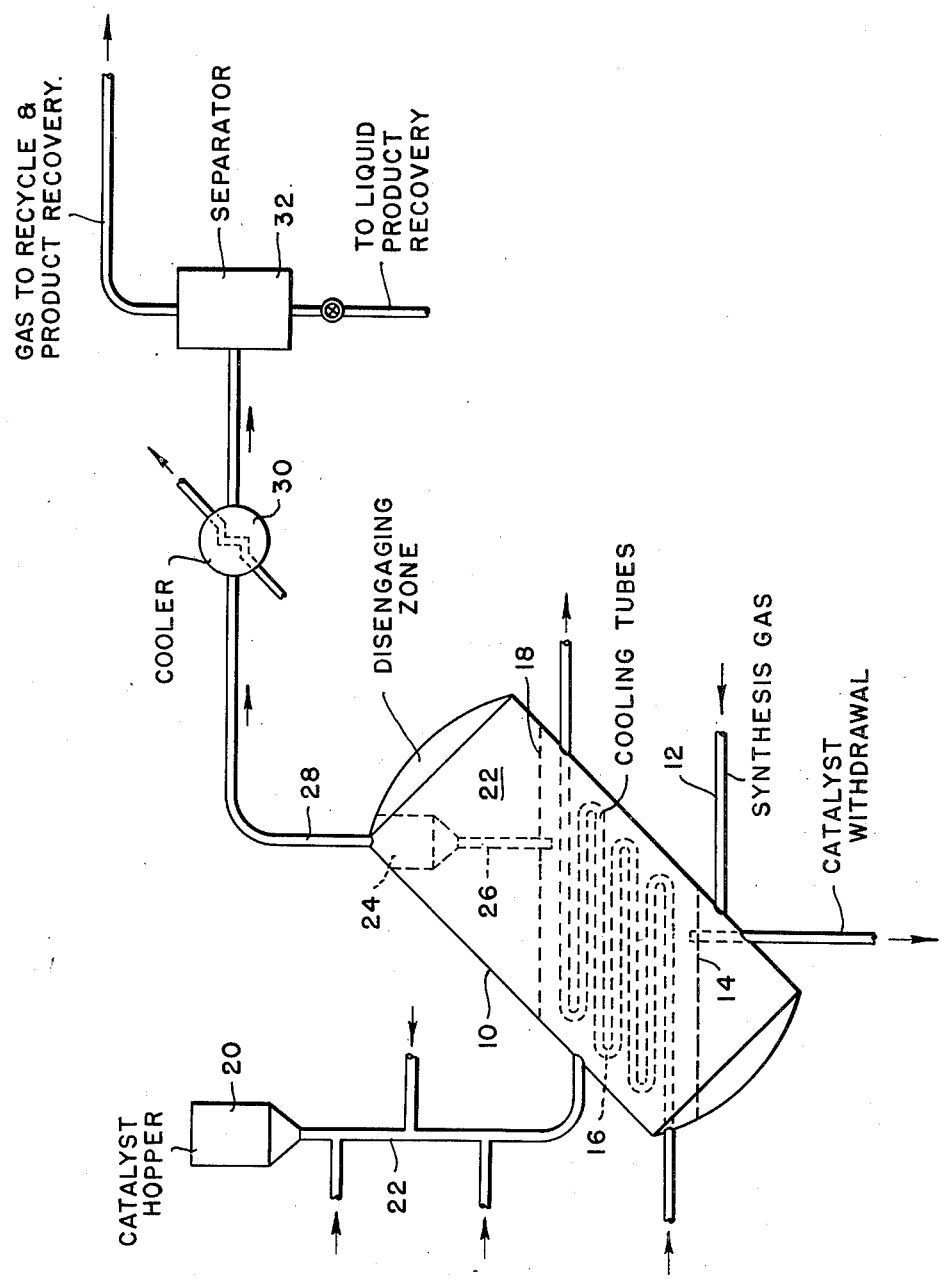

2,622,970

UNITED STATES PATENT OFFICE 2,622,970

APPARATUS FOR HYDROCARBON SYNTHESIS

Homer Z. Martin, Cranford, N. J., assignor to Standard Oil Development Company, a corporation of Delaware Application July 3, 1948, Serial No. 36,987

1 Claim. (Cl. 23—288)

The present invention relates to the synthesis of valuable hydrocarbons and oxygenated hydrocarbons from carbon oxides and hydrogen in the presence of a suitable catalyst. More particularly, the invention relates to a novel and advantageous process and apparatus for carrying out these syntheses employing the fluid catalytic technique in conjunction with high velocity synthesis gas throughput rates.

It is well known that mixtures of carbon monoxide and hydrogen when brought into intimate contact with suitable catalysts under suitable conditions of temperature and pressure are converted into hydrocarbons and oxygenated organic compounds. Valuable unsaturated liquid hydrocarbons boiling in the gasoline range and having high octane ratings are thus obtained. The conversion of carbon monoxide and hydrogen may be carried out in fixed bed, moving bed, slurry, or fluidized solids catalyst type of operation.

It has become well known in the art to effect the conversion of mixtures of oxides of carbon and hydrogen, collectively known as synthesis gas, by contacting the latter in a suitable reaction vessel with finely divided solid catalyst particles to form a dense, turbulent ebullient mass of fluidized particles wherein the solids are relatively uniformly distributed throughout the reaction gas and vapors comprising the fluidizing medium. The reaction between the finely divided catalyst particles and synthesis gas is effected by passing the latter upwardly through the solid material at a velocity sufficient to maintain fluidity within the dense bed of material, whereby a definite upper level of the fluid bed is maintained. The velocity, however, must not be great enough to blow more than a very minor fraction of catalyst out of the dense bed. Above the dense phase level there is a disperse phase wherein upflowing fluidizing medium entrains solids of relatively finer particle size than that in the dense phase. Such a process maintains a rapid and overall circulation of the fluidized solids throughout the dense phase, and thereby maintains relatively uniform temperature and pressure conditions throughout the bed.

Because of the highly exothermal nature of the hydrocarbon synthesis reaction and the high rate of reaction between the components of the synthesis gas in the presence of a synthesis catalyst such as members of the iron group, the employment of the fluidized solids catalyst technique offers many advantages over fixed bed and slurry processes. Thus far greater and more intimate contact can be effected between reactant gases and catalyst material because of the high contact surfaces. The reaction can also be effected under substantially uniform temperature and pressure conditions because of the extremely rapid transfer of heat from one section of the mass to another as a result of the rapid circulation of the aerated solids. Also, as a result of this extreme turbulence, heat may be added or extracted at a relatively rapid rate from the mass of solids in the bed to a heat exchange apparatus located within the dense bed itself.

Advantageous as the fluidized solids technique has shown itself to be, the art as hitherto disclosed has several inherent limitations which thus far have limited the scope of its usefulness, applicability, and efficiency in the synthesis of hydrocarbons from carbon monoxide and hydrogen.

One of these difficulties and limitations is the velocity at which the synthesis gas may be fed to the reactor. As disclosed in the art, the fluid solids operation is usually carried out in a reactor in the form of a vertical cylinder, having a screen or grid located in a lower section, through which the synthesis gas is fed, and which helps support the fluidized catalyst bed by distributing the reagent gases uniformly over the vessel cross section. In such a reactor, the superficial linear velocity of the fluidizing gas through the reactor is a direct function of the inlet velocity of the gas. Though high throughput rates coupled with high conversions and selectivities to useful products would naturally be desired, the velocity of the gas going through the reactor is limited to that rate which will avoid blowing catalyst out of the reactor, or entraining too much catalyst material. On the other hand, if superficial linear velocities are maintained too low, the vessel diameters become uneconomically large. Indeed, extremely low velocities lead to poor heat transfer since high superficial velocities are associated with better heat transfer, mixing, and control. Thus when very low inlet velocities are employed, the rate of heat liberation, particularly at the entrance of the synthesis gas to the reactor, tends to exceed the rate at which the heat can be transferred to internal or external cooling tubes. As a result of the poor heat transfer, hot spots in the catalyst surface are formed, which result in overheating and consequent undesirable side reactions and cracking of reaction products, depositing carbon on the catalyst, thereby not only decreasing its activity but also causing physical deterioration thereof into finely divided fragments of buoyancy sufficient to be carried out of the bed by entrainment in the fluidizing medium.

Another deleterious effect of reduction of heat transfer rate and the consequent formation of hotspots is the sintering and fusing of catalyst particles into agglomerates of greater than fluidizable size, resulting in catalyst loss and poor fluidization and plugging of the grid orifices in the reactor vessel.

A method by which the above-mentioned disadvantages are largely overcome has now been discovered. In accordance with the present invention it is readily possible to operate at feed gas entrance velocities more than sufficient to obtain good heat transfer and control and still not blow catalyst out of the reactor, thus effecting high conversions and high throughput rates. In accordance with the invention, these benefits and advantages are obtained by passing the gaseous fluidizing stream into and through the fluidized reaction zone in such a manner, as described more fully below, that the fluidized particles are given a vertical circulatory motion tangential to the entering feed stream.

In accordance with the present invention, the reaction zone comprises a reactor inclined at an angle of about 45° or less with the vertical. An angle between 20° and 45° is satisfactory. Synthesis gas plus whatever recycle is required may be introduced into the lower portion of the vessel and flows upwardly through a grid or porous plate to the catalyst mass comprising particles of fluidizable size. In accordance with the invention, the area of this distributing means is sufficiently small so that the gas velocity of the entrance to the bed is substantially higher than in the usual design practice; velocities in the range of 1½ to 4 feet per second are desirable. This provides a zone of very high turbulence in the bottom section of the catalyst mass.

The high exothermic heat of reaction is rapidly dissipated not only by the heat transfer to the cooling tubes located in the lower portion of the reaction zone within the dense bed, but also by mixing of the catalyst in the bed. The catalyst is given an upward motion in the section of the reaction zone above the distribution grid, then deflected by the inclined deflecting surface of the zone, thereby a circulatory motion being imparted to the particles. Along the lower inclined surface of the reaction zone the catalyst tends to flow downwardly, and thus by this means a very large circulation of catalyst may be maintained throughout the fluidized bed. Very little heat is liberated in the downward flowing catalyst stream, so that this portion of the catalyst as it flows over the cooling tubes is cooled and meets the incoming fresh synthesis gas at the grid level at a temperature where it is able to absorb a large portion of the heat of reaction. Because of the small resistance offered to the flow in the catalyst circuit the internal circulation rate may be very high.

The invention will best be understood by referring to the accompanying diagrammatic representation of one modification of the present invention. Referring now in detail to the figure, 10 is a reactor preferably in the form of a cylinder inclined at an angle of about 45° with the vertical, and having near the base, feed gas inlet line 12. Within the lower portion of reactor 10 and parallel to the feed gas inlet line 12 is screen or grid 14 whose function it is to effect efficient gas distribution within reactor 10 and serve as support for the fluidized catalyst bed. Also within the lower and middle portion of reactor 10 are a plurality of tubular cooling or heat exchange elements 16, disposed parallel to grid member 14 and spaced vertically apart.

A synthesis gas feed mixture comprising $H_2$ and CO in the ratio of about 1½–2 mols $H_2$ to 1 mol CO is introduced into reactor 10 through line 12, and flows upwardly through grid member 14. Within reaction vessel 10 a mass of subdivided alkali metal promoted iron catalyst having a particle size distribution such that less than about 20% of the particles have diameters in the range of 0–20 microns and less than 10% of the particles have diameters larger than about 80 microns is maintained in the form of a dense turbulent bed, having a well-defined upper level 18. This catalyst may be supplied to reactor 10 from catalyst hopper 20 through aerated standpipe 22. The superficial velocity of the gases within reactor 10 may be 0.3 to 3 or 4 feet per second, preferably in the range of from about 0.5 to 1.5 feet per second. Under these conditions the catalyst in reactor 10 assumes the form of a turbulent mass, resembling a boiling liquid with a more or less well-defined upper level, and having an apparent density of about 25 to 75 or more pounds per cubic foot, dependent upon the fluidization conditions, the lower apparent density being associated with the higher velocities. The pressure within reactor 10 is maintained at from about atmospheric to about 650 p. s. i. g., depending upon the type conversion product desired, and the temperature within the fluidized mass is kept uniform in the range of about 250°–750° F. by temperature control by means of exchanger or cooling tubes 16.

As disclosed in the present invention, a high degree of temperature control coupled with high inlet gas velocities are obtained by passing the stream of synthesis gas into inclined reactor 10 below horizontal gas distributing grid 14, supporting the dense fluidized catalyst mass. The main portion of the gas stream is then deflected upwardly through grid 14 as it enters a portion of the fluidized bed opposite from the point at which the gas stream enters reactor 10. The main inlet stream thus propels the particles of catalyst in that portion of the catalyst bed so that they impinge on the cooling surfaces 16 on the upper inclined surface of reactor 10 within the dense bed, and too are given a circulatory motion. The circulating particles disengage from the reactant gases and vapors which pass upwardly above level 18. The disengaged particles gravitate downwardly over the cooling surfaces 16 and the lower inclined surface of reactor 10, further cooling these catalyst particles; the latter then meet the incoming fresh gas at grid 14 at a temperature substantially below the temperature of reaction.

Volatile reaction products, entrained catalyst and unreacted synthesis gas are withdrawn from the dense bed into catalyst disengaging zone 22. In this zone the bulk of the catalyst entrained in the fluidizing medium disengages itself from the latter and gravitates to the dense bed. In accordance with the invention, wherein the synthesis is carried out in an inclined cylindrical reaction zone, an exceptionally large area is made available for catalyst disengagement, materially decreasing the load on the subsequent gas solid separation system. From disengaging zone 22 the gaseous reaction products and reactants carrying entrained catalyst fines is passed through cyclone 24, or other means of gas-solids separation, such as a filter or electrical precipitator. Recovered catalyst fines are returned through dippipe 26 to the dense bed below upper level 18. The reaction gases substantially free of suspended catalyst, are withdrawn overhead through line 28, through cooling zone 30 to separator 32, wherein liquid and gaseous products may be separated. Gaseous and liquid products may be recovered and processed through methods well known in the art, such as oil scrubbing, distillation, compression, adsorption of uncondensable gases on active surfaces, etc. Preferably, at least a portion of the gas from separator 32 is sent to reactor 10 as recycle.

Thus by the process of this invention there is obtained high degree of temperature control and dissipation of heat of reaction coupled with desirable high velocity levels of synthesis feed gas rates into the reactor without substantial losses of fluidized catalyst due to entrainment.

The foregoing description, though illustrating a preferred embodiment of the invention, is not intended to exclude other modifications obvious to those skilled in the art and which are within the scope of the invention.

What is claimed is:

An apparatus for promoting the synthesis of hydrocarbons from synthesis gas containing hydrogen and carbon monoxide comprising a closed elongated reaction chamber having an elongated cylindrical wall inclined at an angle of about 20° to about 45° with respect to the horizontal, a synthesis gas inlet line entering the lower portion of said chamber through the bottom surface of said wall in a substantially horizontal plane, substantially horizontal grid means also in a lower portion of said vessel but above said gas inlet for distributing entering synthesis gas and for supporting a fluidized bed of catalyst in said chamber, means also in a lower portion of said vessel and spaced above said grid means for introducing a stream of finely divided hydrocarbon synthesis catalyst into said fluidized bed, means above the grid means for controlling temperature and withdrawing heat of reaction from the bed of catalyst, and means for removing synthesis products from the upper portion of said reaction chamber.

HOMER Z. MARTIN.

REFERENCES CITED

The following references are of record in the file of this patent:

UNITED STATES PATENTS

| Number | Name | Date |
| --- | --- | --- |
| 2,347,682 | Gunness | May 2, 1944 |
| 2,367,351 | Hemminger | Jan. 16, 1945 |
| 2,383,636 | Wurth | Aug. 28, 1945 |
| 2,394,680 | Gerhold et al. | Feb. 12, 1946 |
| 2,418,837 | Houdry | Apr. 15, 1947 |
| 2,502,953 | Jahnig | Apr. 4, 1950 |

FOREIGN PATENTS

| Number | Country | Date |
| --- | --- | --- |
| 571,143 | Great Britain | Aug. 9, 1945 |